(12) United States Patent
Kimball et al.

(10) Patent No.: US 8,285,987 B1
(45) Date of Patent: Oct. 9, 2012

(54) EMULATION-BASED SOFTWARE PROTECTION

(75) Inventors: William B. Kimball, Dayton, OH (US); Rusty O. Baldwin, Huber Heights, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 538 days.

(21) Appl. No.: 12/631,099

(22) Filed: Dec. 4, 2009

(51) Int. Cl.
*H04L 29/06* (2006.01)
(52) U.S. Cl. .......................................... 713/164; 726/26
(58) Field of Classification Search ........ 718/1; 713/164; 726/26
See application file for complete search history.

(56) References Cited

U.S. PATENT DOCUMENTS

| | | | |
|---|---|---|---|
| 4,634,807 A | 1/1987 | Chorley et al. | |
| 5,088,033 A | 2/1992 | Binkley et al. | |
| 5,574,873 A | 11/1996 | Davidian | |
| 5,751,982 A | 5/1998 | Morley | |
| 5,819,063 A | 10/1998 | Dahl et al. | |
| 2008/0040710 A1 | 2/2008 | Chiriac | |
| 2009/0144561 A1 | 6/2009 | Davidson et al. | |

OTHER PUBLICATIONS

"QEMU Open Source Processor Emulator", web posting on nongnu.org, Nov. 2, 2009.

*Primary Examiner* — Gilberto Barron, Jr.
*Assistant Examiner* — Devin Almeida
(74) *Attorney, Agent, or Firm* — AFMCLO/JAZ; Rebecca Greendyke

(57) ABSTRACT

A method of emulation-based page granularity code signing comprising the steps of: copying guest operating system instructions and associated hash message authentication codes and/or digital signatures of each guest operating instruction from an untrusted guest operating system memory into a trusted host operating system memory; recomputing the hash message authentication codes using a secret key in the trusted host operating system memory; maintaining the secret key in the trusted host operating system memory and inaccessible by the untrusted guest operating system instructions; translating each guest operating system instruction that has a valid hash message authentication code to a set of host operating system instructions; executing the decrypted guest operating system instructions in the trusted host operating system; and modifying the guest operating system memory and registers when the set of translated host operating instructions executes in the trusted host operating system, such that it appears as if the original guest operating system instructions had been executed in the untrusted guest operating system.

23 Claims, 6 Drawing Sheets

```
.SigStub:01014000                 jmp       Short $+2           ; jmp patch
.SigStub:01014002                 pushf
.SigStub:01014003                 pusha
.SigStub:01014004                 mov       edx, offset byte_101404D
.SigStub:01014009                 mov       edx, edx
.SigStub:0101400B                 add       edx, 10h            ; skip IV/Salt
.SigStub:01014011
.SigStub:01014011 ReadSignedBlock:                              ; CODE XREF: start+1C↓j      201
.SigStub:01014011                 mov       eax, [ecx]
.SigStub:01014013                 test      eax, eax
.SigStub:01014015                 jz        Short loc_101401E
.SigStub:01014017                 mov       al, [eax]           ; read signed page
.SigStub:01014019                 add       ecx, 28h
.SigStub:0101401C                 jmp       short ReadSignedBlock
.SigStub:0101401E ; ------------------------------------------------------------------------
.SigStub:0101401E
.SigStub:0101400E loc_101401E:                                  ; CODE XREF: start+15↓j
.SigStub:0101401E                 mov       edx, edx
.SigStub:01014020                 add       edx, 0B0h           ;skip IV/Salt and HMACs
.SigStub:01014026
.SigStub:01014026 ReadEncryptedBlock:                           ; CODE XREF; start+31↓j     202
.SigStub:01014026                 mov       eax, [ecx]
.SigStub:01014028                 test      eax, eax
.SigStub:0101402A                 jz        short loc_1014033
.SigStub:0101402C                 mov       al, [eax]           ; read eEncrypted page
.SigStub:0101402E                 add       ecx, 8
.SigStub:01014031                 jmp       short ReadEncryptedBlock
.SigStub:01014033 ; ------------------------------------------------------------------------
.SigStub:01014033
.SigStub:01014033 loc_1014033:                                  ; CODE XREF: start+2A↓j
.SigStub:01014033                 mov       edx, 0DEADBEEFh     ; magic value
.SigStub:01014038                 mov       edx, 0DEEDBEEDh     ; task value               203
.SigStub:0101403D                 int       2Eh                 ; signal SecureQEMU
.SigStub:0101403F                 mov       byte ptr ds:start+1, 46h  ; patch jmp
.SigStub:01014046                 popa
.SigStub:01014047                 popf
.SigStub:01014048                 jmp       _WinMainCRTStartup
.SigStub:01014048 start           endp
.SigStub:01014048                           Initialization Vector and Salt  204   HMACs  205
.SigStub:01014048 ; ------------------------------------------------------------------------
.SigStub:0101404D byte_101404D    db 49h, 19h, 0E2h             ; DATA XREF: start+4↑o
.SigStub:01014050                 dd 6OF485A1h, 295AEECFh, 388E5FBDh, 2000EFh, 100001h, 4BD71900h
.SigStub:01014050                 dd 0DE733992h, 0A2582BC0h, 9B7BA903h, 0BB995D08h, 0A2278F70h
.SigStub:01014050                 dd 4EF11620h, 6F0890A5h, 3000E7h, 100001h, 7CCD7400h, 652AFC6Bh
.SigStub:01014050                 dd 0B2745EEDh, 0B666D893h, 0E40CEDF6h, 8F13ABA2h, 0CD404D5Ch
.SigStub:01014050   Virtual       dd 4C38DF7Eh, 300004h, 100001h, 7CCD7400h, 652AFC6Bh, 0B2745EEDh
.SigStub:01014050                 dd 0B666D893h, 0E40CEDF6h, 8F13ABA2h, 0CD404D5Ch, 4C38DF7Eh
.SigStub:01014050   Addr/Size     dd 4, 9 dup(0)
.SigStub:010140FC0                dd 19200h, 6E001h, 200000h, 100001h, 300000h, 100001h
.SigStub:010140FC  Encrypted      dd 400000h, 100001h, 500000h, 100001h, 600000h, 100001h
.SigStub:010140FC                 dd 700000h, 5F001h, 33h dup(0)
.SigStub:01014200   Blocks        dd 380h, dup(?)
.SigStub:01014200 _SigStub        ends
```

*Fig. 2*

EMULATION-BASED SOFTWARE PROTECTION

RIGHTS OF THE GOVERNMENT

The invention described herein may be manufactured and used by or for the Government of the United States for all governmental purposes without the payment of any royalty.

TECHNICAL FIELD

This disclosure relates generally to emulation-based software protection. In particular, it relates to emulation-based software protection that provides protection against reverse code engineering and software exploitation.

BACKGROUND

Computer software is ubiquitous. It is used to operate our cars, our cellular phones, our televisions, and of course, our personal computers. In 2007, the United States Environmental Protection Agency estimated that Americans collectively own three billion electronic devices. Many of these devices run software to provide us with capabilities upon which we have become increasingly dependent.

Our increasing dependence on such electronic devices and the increasing prevalence of such devices creates vulnerabilities to our activities and lifestyles from attacks on these devices. Although software gives electronic devices many of the capabilities that we want and need, software also is part of the vulnerability of many of these devices. The ramifications to individuals, companies, and society are grave if cell phones, vehicles, televisions, and other electronic devices fail to work properly or not at all. Such failures can affect our ability to get to work, pay our bills, or buy our food to cite just a few examples of the adverse consequences that could result from software exploitation of electronic devices. As computer software increases society's standard of living with respect to communication and convenience, this benefit alone warrants improved software security. However, a much greater need exists for software security.

Besides our personal lives, our national security depends on computer software. Power grids, financial systems, airlines, and virtually every defense system use software. These systems are vulnerable to attack at many levels, including their software. The damage from a successful attack on any of these systems could be incalculable. If a software vulnerability led to a crash of the stock market or erasure and destruction of bank accounts and financial records, the financial system could be thrown into chaos. If our adversaries could control our defense systems, our national defense would be jeopardized. These examples illustrate the grave risks arising from software vulnerability and exploitation. There are many other scenarios where an attack on computer software would result in severe loss for the country because software security crosses all physical domains of land, sea, air, and space.

Software security experts such as Gary McGraw attribute the growth and evolution of software vulnerability to connectivity, extensibility and complexity. These characteristics often result in design and implementation errors that are vulnerable to attack. In turn, these vulnerabilities result in the development of malicious code (malware) such as worms, viruses, backdoors and rootkits designed to exploit these vulnerabilities. The number of vulnerabilities reported each year by the Computer Emergency Response Team has increased from less than 300 in 1995 to more than 8,000 in 2006 and more than 7,000 in 2007.

The increased connectivity of computers and networks gives would-be attackers the ability to attack systems independent of their geographical location. For example, the Internet provides connectivity to banks and airline systems. Power grids are interconnected by supervisory control and data acquisition (SCADA) systems. Businesses use online web services, such as email, instant messaging, and advertising. Increased system connectivity increases exposure, and thus attack surface.

Connectivity exists in both virtual and physical domains. A virtually closed system (local connectivity only) is not secure because access to the systems' physical hardware could result in a compromise. Furthermore, an attacker could gain access to a closed system by blackmailing or impersonating a legitimate user of the system.

Extensibility is another major factor to consider when securing computer software. In computer software, extensibility is a design principle that incorporates the ability for software to grow. Software is developed to fill a need, but that need changes constantly. Major operating systems such as WINDOWS®, LINUX®, and BSD®, were designed to be updated. Newer versions of operating systems are constantly being released and each release adds new vulnerabilities. Even with cryptographic signing, it is not always possible for a system to determine if an update or extension is malicious.

Complexity is a third major factor that affects software security. Software complexity is often measured in lines of code. The more lines of code in a program, the more potential vulnerabilities exist. Microsoft WINDOWS® Vista alone consists of fifty million lines of code. Other WINDOWS® operating systems range in complexity from WINDOWS® 3.1 with around four million lines of code to WINDOWS® XP with forty million lines of code. Even if every vulnerability in an operating system was discovered and removed, applications and device drivers that run on those operating systems could contain errors that make the overall computer system and its software vulnerable to attack.

As a result of the vulnerabilities inherent in connectivity, extensibility, and complexity, attackers can gain access to, and maintain a presence within, computer systems using a wide variety of software exploits, backdoors, and rootkits. Although each of these techniques provides separate attack capabilities, almost all of these techniques execute malicious code. Malicious code also may be used as a means to thwart security mechanisms and exfiltrate confidential information from a system. A common thread of each of these schemes is that an attacker compromises a computer system by executing code within that system.

Connectivity, extensibility, and complexity also make it difficult to design and implement secure software. Consequently, detection and protection technologies have been developed. However, these technologies are ineffective in preventing all vulnerabilities within a software environment. As long as software vulnerabilities can be exploited, as they currently can, there will be a need for improved software security.

Operating systems currently in use are designed for general purpose computing. For example, WINDOWS®, LINUX®, BSD®, SUNOS®, and UNIX® operating systems help fulfill a variety of capabilities by allowing users to execute arbitrary code. Although most operating systems provide some security (separate user and kernel address space along with object access control, privileges, and the like), common attack techniques such as exploits, backdoors and rootkits may execute in the user-space, at the least privileged level. This can occur because an attacker can execute arbitrary code, as well as a user. Furthermore, CPUs unremittingly execute code without knowing anything about its semantics. To provide better security within traditional operating systems, it is essential to control and limit the specific code executed on those operating systems.

One approach has been the use of software emulation. FIG. 6 illustrates a known emulation model 600 that includes a Guest OS Memory 601 and a Host OS Memory 602. The Guest OS Memory 601 includes Guest OS Instructions 603. The Host OS Memory 602 includes registers for Guest OS Instructions 604 and for Translated Guest OS Instructions 605. The Guest OS Memory 601 is thereby emulated by the Host OS Memory 602. At step 610, the Host OS Memory 602 copies Guest OS instructions 603 from the Guest OS Memory 601 into the Host OS Memory 604. At step 620, the Guest OS instructions 604 in the Host OS Memory 602 are translated (or interpreted) into Translated Guest OS Instructions 605 that run on the Host OS Memory 602 as Host OS instructions. When these Translated Guest OS instructions execute in the Host OS Memory 602, the state of the Guest OS Memory 601 and registers are modified at step 630 such that it appears as if the original Guest OS instructions 603 had been executed in the Guest OS Memory 601.

This emulation process provides a sandbox that ensures that the Guest OS instructions 603 read and write in the Guest OS Memory 601, exclusively. The Host OS Memory 602 cannot be accessed by the Guest OS instructions 603 that reside in the Guest OS Memory 601. Thus, any attacks on the Guest OS memory 601, even if successful, cannot reach or otherwise affect the Host OS Memory 602 where the copied Guest OS Instructions 604 are translated and executed. In addition, the translated Host OS Instructions, i.e., the Translated Guest OS Instructions 605, cannot read or write the Host OS memory 602. As a result, the Translated Guest OS Instructions 605 are never self-reading. A would-be attacker is confined in the Guest OS Memory sandbox 601, unable to access or otherwise manipulate the Guest OS Instructions 604 that are emulated, translated, and executed by the Host OS Memory 602. In this way, would-be attackers are prevented from introducing malicious code in the Host OS Memory 602.

Although such emulation schemes can reduce software vulnerabilities to a restricted environment, they do not protect against reverse code engineering (RCE) of the software within that environment. They also do not protect against software vulnerabilities such as buffer overflows, index array out of bound errors, race conditions, integer overflows, and other types of memory corruption vulnerabilities. Thus, such schemes still do not provide adequate protection for computer devices and software against attempts to bypass a security policy.

SUMMARY

The software protections disclosed herein improve upon known emulation-based protection schemes by using encryption and digital signatures to enhance the protection of computer systems and software. These mechanisms protect computer systems and software by controlling an operating system (OS), for example a general purpose OS such as a WINDOWS®, LINUX®, BSD®, SUNOS®, UNIX®, or other OSs, independent of privilege level, through a novel system of emulation. This emulation duplicates the functions of an OS by using a separate system to provide a secure, controlled execution environment. However, it also maintains the encryption and digital signature security mechanisms out-of-band of an untrusted OS that is being emulated so that would-be attackers cannot circumvent or compromise these additional security features. As disclosed herein, an untrusted OS is the OS being emulated and a trusted OS is the system providing the emulation of the untrusted OS.

This original emulation-based software protection scheme protects OSs against RCE and software exploitation techniques by using encrypted code execution and page-granularity code signing. These mechanisms execute in trusted emulators while remaining out-of-band of the untrusted OSs that are emulated. This protection scheme, referred to herein as SecureQEMU, provides improved protection mechanisms for emulation techniques used in QEMU®.

RCE tries to uncover the internal workings of a program or OS. RCE is used during vulnerability and intellectual property discovery. Efforts to prevent or protect against RCE program code often rely on anti-disassembly, anti-debugging, and obfuscation techniques. Although these techniques slow the RCE process, once they are defeated, the protected code is comprehensible and therefore exploitable. The disclosed software protections overcome these limitations by encrypting the guest OS instructions and keeping those instructions encrypted within the untrusted emulated environment of the guest OS during execution, in contrast to static code protection where the encrypted code is decrypted before execution within the untrusted emulated environment. Decryption routines and secret keys remain out-of-band of the emulated environment.

SecureQEMU's emulation-based security protection mechanisms, page-granular code signing, and encrypted code execution also protect computer systems from exploits, backdoors, rootkits, and other malware attacks. Together, these protection mechanisms provide confidentiality and separation of privilege at the emulation layer. SecureQEMU's protection is provided in addition to the existing OS security.

SecureQEMU's emulation-based page granularity code signing protects against most exploits, backdoors, and rootkits, by preventing those exploit payloads from executing. Instead of focusing on defending a system against individual programming bugs, which may or may not result in a vulnerability, page-granularity code signing focuses on identifying legitimate code and preventing all other code from executing in the emulated environment. This whitelist approach to software security protects against unreleased vulnerabilities, also called "0-days," which leverage a new class of software bugs to execute. This protection mechanism also protects against DLL injection, code integration-based rootkits, patching rootkits, and backdoors that infect legitimate modules.

SecureQEMU's emulation-based encrypted code execution protects against reverse code engineering by keeping code encrypted during execution. Existing protections merely make it more difficult to reverse engineer applications through anti-debugging, anti-disassembly, and obfuscation techniques. The novel emulation-based approach disclosed herein not only protects against vulnerability discovery and code injection attacks, but also keeps code-specific intellectual property secret through encryption and emulation-based sandboxing.

Moreover, unlike known emulation schemes, SecureQEMU's use of encryption and digital signatures provides confidentiality and data integrity. Unlike other encryption-based software protections, SecureQEMU does not obfuscate the decryption process or use contextual keying. It does not do so because decryption routines and keys remain out-of-band of the untrusted OS that is emulated. This configuration obviates the need for obfuscation and contextual keying.

In one embodiment, a program storage device readable by a machine, tangibly embodies a program of instructions executable by the machine to perform method steps for executing instructions in an emulated environment, comprising the steps of: copying encrypted guest operating system instructions from an untrusted guest operating system memory into a trusted host operating system memory; decrypting the encrypted guest operating system instructions in the trusted host operating system memory; maintaining the decrypted guest operating system instructions out-of-band of the untrusted guest operating system and inaccessible by the untrusted guest operating system; translating the decrypted guest operating system instructions to a set of host operating system instructions; executing the decrypted guest operating system instructions in the trusted host operating system; and modifying the untrusted guest operating system memory and registers when the set of translated host operating instructions executes in the trusted host operating system such that it appears as if the original guest operating instructions had been executed in the untrusted guest operating system.

In another embodiment, a method of emulation-based page granularity code signing comprises the steps of: copying guest operating system instructions and associated hash message authentication codes and/or digital signatures of each guest operating instruction from an untrusted guest operating system memory into a trusted host operating system memory; recomputing the hash message authentication codes using a secret key in the trusted host operating system memory; maintaining the secret key in the trusted host operating system memory and inaccessible by the untrusted guest operating system instructions; translating each guest operating system instruction that has a valid hash message authentication code to a set of host operating system instructions; executing the decrypted guest operating system instructions in the trusted host operating system; and modifying the guest operating system memory and registers when the set of translated host operating instructions executes in the trusted host operating system, such that it appears as if the original guest operating system instructions had been executed in the untrusted guest operating system.

In a further embodiment, a storage medium which embodies instructions executable by a computer for emulating an untrusted guest operating system on a trusted host operating system, comprises: a first segment including emulator code, wherein the emulator code copies encrypted guest operating system instructions from an untrusted guest operating system memory into a trusted host operating system memory; a second segment including decryption code for decrypting the encrypted guest operating system instructions in the trusted host operating system memory; a third segment including translating code for translating the decrypted guest operating system instructions to a set of instructions to be executed in the trusted host operating system; and a fourth segment including code for executing the decrypted and translated guest operating system instructions in the trusted host operating system and modifying the untrusted guest operating system memory and registers when those instructions are executed in the trusted host operating system, such that it appears as if the original encrypted guest operating system instructions had been executed in the untrusted guest operating system.

In yet another embodiment, a method of emulating an untrusted guest operating system, comprises the steps of: copying guest operating system instructions and hash message authentication codes or digital signatures from an untrusted guest operating system memory into a trusted host operating system memory; recomputing each hash message authentication code or signature of the imported guest operating system instructions using a secret key that is stored in the trusted host operating system memory; translating or interpreting each guest operating instruction that has a valid hash message authentication code or digital signature into one or more host operating system instructions; executing each of the translated or interpreted guest operating system instructions in the trusted host operating system; and modifying the state of the untrusted guest operating system memory and registers such that it appears as if the original guest operating system instructions that were executed in the trusted host operating system memory have been executed on the untrusted guest operating system memory.

In a still further embodiment, a computer system, comprises: a processor; a program storage device readable by the computer system, tangibly embodying a program of instructions executable by the computer system to emulate an untrusted guest operating system in a trusted host operating system, wherein the program of instructions includes the steps of copying encrypted guest operating system instructions from an untrusted guest operating system memory into a trusted host operating system memory; decrypting the guest operating system instructions in the trusted host operating system memory; maintaining the decrypted guest operating system instructions out-of-band of the untrusted guest operating system and inaccessible by the untrusted guest operating system; translating the decrypted guest operating system instructions to a set of host operating system instructions; executing the decrypted guest operating system instructions in the trusted host operating system; and modifying the guest operating system memory and registers when the set of translated host operating instructions executes in the trusted host operating system such that it appears as if the original guest operating instructions had been executed.

Other embodiments include an apparatus for emulating an untrusted guest operating system in a trusted host operating system comprising: a processor; a storage device storing a program of instructions executable by the processor to emulate an untrusted guest operating system in a trusted host operating system, wherein the program of instructions includes the steps of copying encrypted guest operating system instructions from an untrusted guest operating system memory into a trusted host operating system memory; decrypting the guest operating system instructions in the trusted host operating system memory; maintaining the decrypted guest operating system instructions out-of-band of the untrusted guest operating system and inaccessible by the untrusted guest operating system; translating the decrypted guest operating system instructions to a set of host operating system instructions; executing the decrypted and translated guest operating system instructions in the trusted host operating system; and modifying the untrusted guest operating system memory and registers when the set of translated host operating instructions executes in the trusted host operating system such that it appears as if the original guest operating instructions had been executed in the untrusted guest operating system.

BRIEF DESCRIPTION OF THE DRAWINGS

FIG. 2 discloses a .SigStub configuration.

DETAILED DESCRIPTION

The emulation-based software protection mechanisms disclosed herein protect against, and prevent, reverse code engineering (RCE) and software exploitation by using encrypted code execution and page-granularity code signing. These protection mechanisms execute within trusted emulators while remaining out-of-band of the untrusted systems that are emulated. These schemes utilize emulation sandboxing, emulation-based encrypted code execution, and emulation-based page granularity code signing protection mechanisms, and rely upon attackers remaining sandboxed within the untrusted, emulated environments.

Emulation sandbox protection schemes are generally more secure because it is more difficult to "break out," that is to read, write, and/or execute memory that is not allocated for the emulated environment, of an emulation-based sandbox than it is to break out of a user-mode (Ring 3) to kernel-mode (Ring 0). The encryption and digital signature emulation-based protection mechanisms disclosed herein are implemented out-of-band of an emulated environment. Therefore, they are less susceptible to attack than systems that rely on kernel protection mechanisms.

Figure 3:
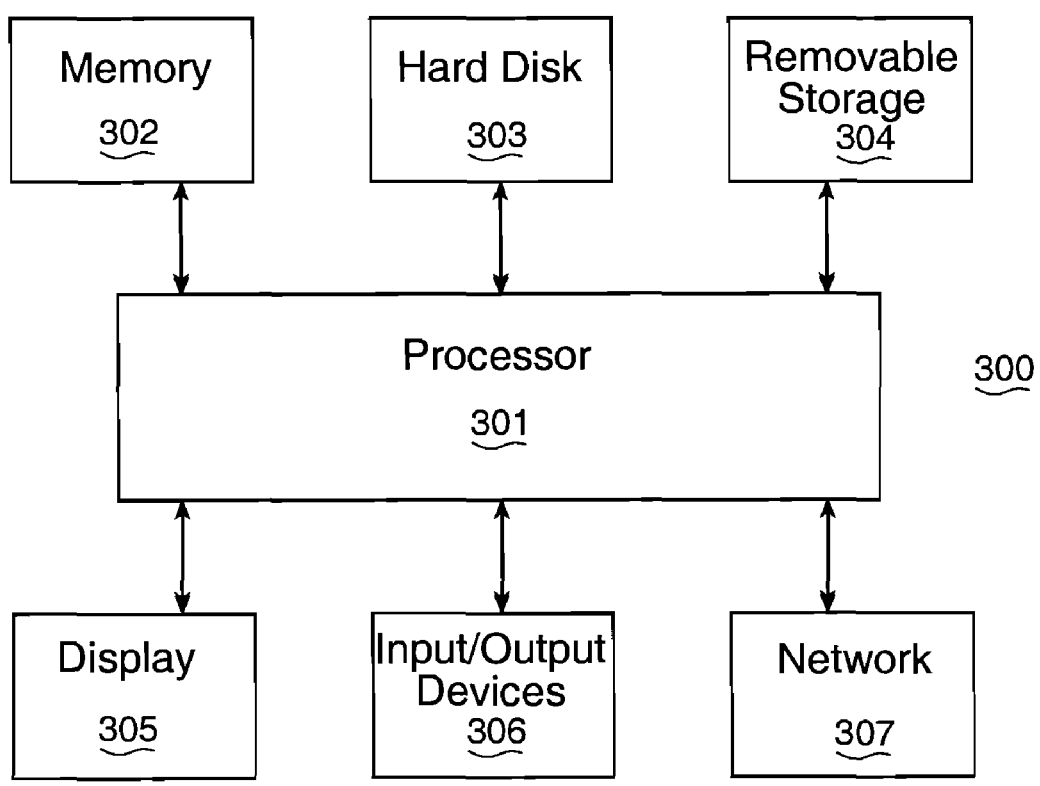
FIG. 3 is a block diagram of an exemplary computing system on which the disclosed emulation-based software protection can operate.

The emulation-based software protection mechanisms disclosed herein can be used on a wide range of operating systems and computer systems and devices. FIG. 3 illustrates an exemplary computer system 300 on which these emulation-based protection mechanisms can be used to protect against, and prevent, RCE, software exploitation, and similar intrusions. The computer system 300 includes a processor 301, memory 302, one or more hard disks 303, one or more removable storage drives 304 for reading/accessing a removable storage media such as a floppy disk, CD, DVD, thumb drive and the like, a display 305, one or more input/output (I/O) devices 306 such as a keyboard, a mouse, microphone, speaker, and the like, and a wired or wireless network connection 307. The network connection 307 may be, for example, to a LAN, a WAN, an intranet, an extranet, the Internet, a VPN, and/or any combination of such networks. The computer 300 may be any computing device or system, including for example, a personal computer, a laptop, a workstation computer, a mainframe computer, a personal digital assistant, and the like. The computer 300 may run on or operate any OS including, for example, WINDOWS®, LINUX®, BSD®, SUNOS®, UNIX®, and other OSs, and the like, whether proprietary or open source.

Figure 7:
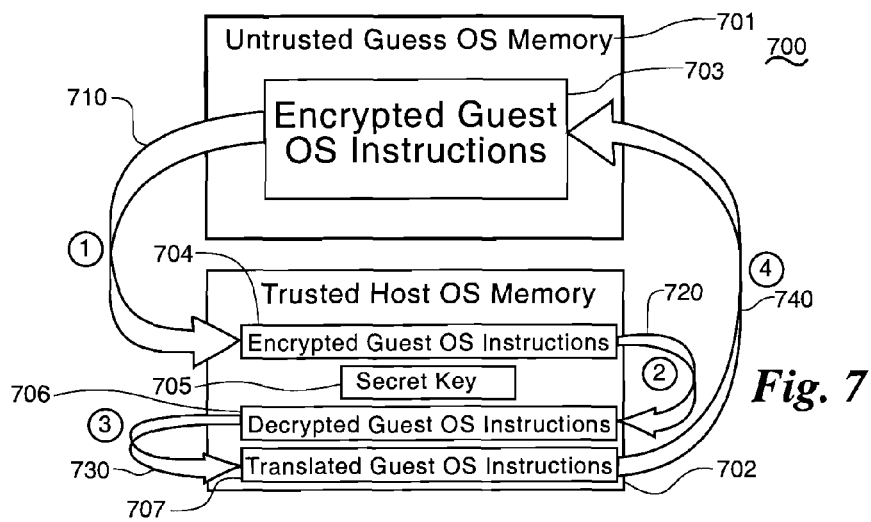
FIG. 7 is an embodiment of an encrypted code execution scheme.

The SecureQEMU software protection disclosed herein improves upon basic emulation schemes by using encryption and signatures. FIG. 7 illustrates an embodiment of SecureQEMU that includes an encrypted code execution scheme 700 with an Untrusted Guest OS Memory 701 and a Trusted Host OS Memory 702. The Untrusted Guest OS Memory 701 includes registers for Encrypted Guest OS Instructions 703. The Trusted Host OS Memory 702 includes Encrypted Guest OS Instructions 704, a secret key 705, Decrypted Guest OS Instructions 706, and Translated Guest OS Instructions 707.

In operation, the Trusted Host OS Memory 702 copies encrypted Guest OS instructions 703 from the Untrusted Guest OS Memory 701 into the Encrypted Guest OS Instructions registers 704 of the Trusted Host OS Memory 702 at step 710. The Encrypted Guest OS instructions 704 are decrypted in the Trusted Host OS Memory 702 at step 720 using the stored secret key 705. In this way, the Decrypted Guest OS Instructions 706 always remain out-of-band of the Guest OS Memory 701 and are not accessible by the Encrypted Guest OS Instructions 703 in the Guest OS Memory 701. At step 730, the Decrypted Guest OS Instructions 706 are translated (or interpreted) to a set of Host OS Instructions, i.e., Translated Guest OS Instructions 707. When this set of Translated Guest OS instructions 707 executes in the Trusted Host OS Memory 702, the state of the Untrusted Guest OS memory 701 and registers are modified at step 740 such that it appears as if the original Encrypted Guest OS instructions 703 were executed in the Untrusted Guest OS Memory 701. As a result, the Untrusted Guest OS Memory 701 never reads the Decrypted Guest OS Instructions 706. The Decrypted Guest OS Instructions 706 are only read in the Trusted Host OS Memory 702 after they are decrypted in the Trusted Host OS Memory 702 at step 720 using Trusted Host OS routines and the secret key 705 and then translated at step 730. Because the Trusted Host OS Memory 702 cannot be accessed by the Encrypted Guest OS Instructions 703 in the Untrusted Guest OS Memory 701, the decrypted instructions and decryption routines in the Trusted Host OS Memory 702 remain out-of-band and are not susceptible to attack.

Figure 8:
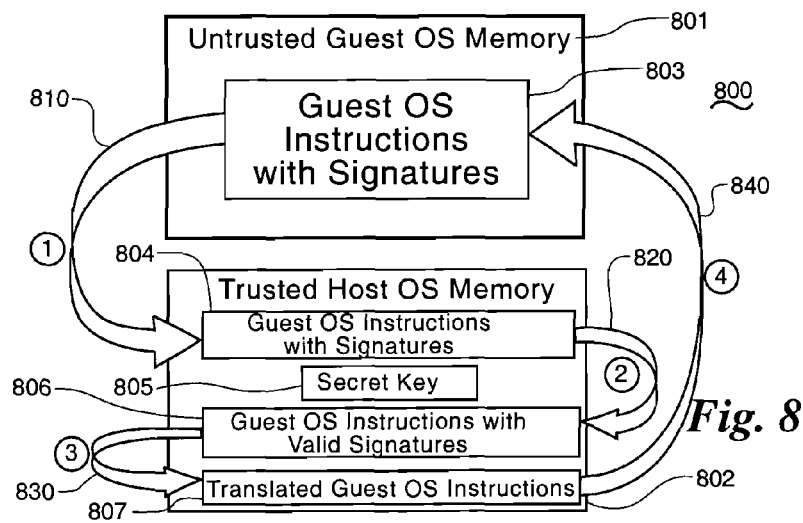
FIG. 8 is an embodiment of a page granularity code signing scheme.

FIG. 8 illustrates another embodiment of SecureQEMU that uses digital signatures for data integrity. This protection mechanism involves an Untrusted Guest OS Memory 801 and a Trusted Host OS Memory 802. The Untrusted Guest OS Memory 801 includes registers for Guest OS Instructions with Signatures 803. The Trusted Host OS Memory 802 includes registers for Guest OS Instructions with Signatures 804 that are copied from the Untrusted Guest OS Memory 801, a secret key 805, registers for Guest OS Instructions with Valid Signatures 806, and registers for Translated Guest OS Instructions 807.

In operation, the Trusted Host OS copies Guest OS Instructions and Hash Message Authentication Codes (HMACs) or digital signatures, i.e., Guest OS Instructions with Signatures 803, from the Untrusted Guest OS Memory 801 to the registers for the Guest OS Instructions with Signatures 804 of the Trusted Host OS Memory 802 at step 810. The HMACs of the imported Guest OS Instructions with Signatures 804 are recomputed using the secret key 805 that is stored in the Trusted Host OS Memory 802 at step 820. The secret key 805 remains in the Trusted Host OS Memory 802 and is inaccessible by the Guest OS Instructions with Signatures 803 in the Untrusted Guest OS Memory 801. The Guest OS Instructions with Valid Signatures 806 (e.g., valid HMACs) are translated (or interpreted) at step 830 into a set of Host OS instructions, i.e., the Translated Guest OS Instructions 807. When the Translated Guest OS Instructions 807 are executed in the Trusted Host OS Memory 802, the state of the Untrusted Guest OS Memory 801 and registers are modified at step 840 so that it appears as if the original Guest OS Instructions with Signatures 803 were executed in the Untrusted Guest OS Memory 801. Any Guest OS Instructions with invalid HMACs remain encrypted. The encrypted instructions are translated and executed in the Trusted Host OS Memory 802 and this usually results in a Guest OS exception terminating the process. All Guest OS code needs to be signed with a secret key. Any unsigned malicious code is treated as unsigned code. When the emulator detects such unsigned code it halts the Guest OS.

Figure 9:
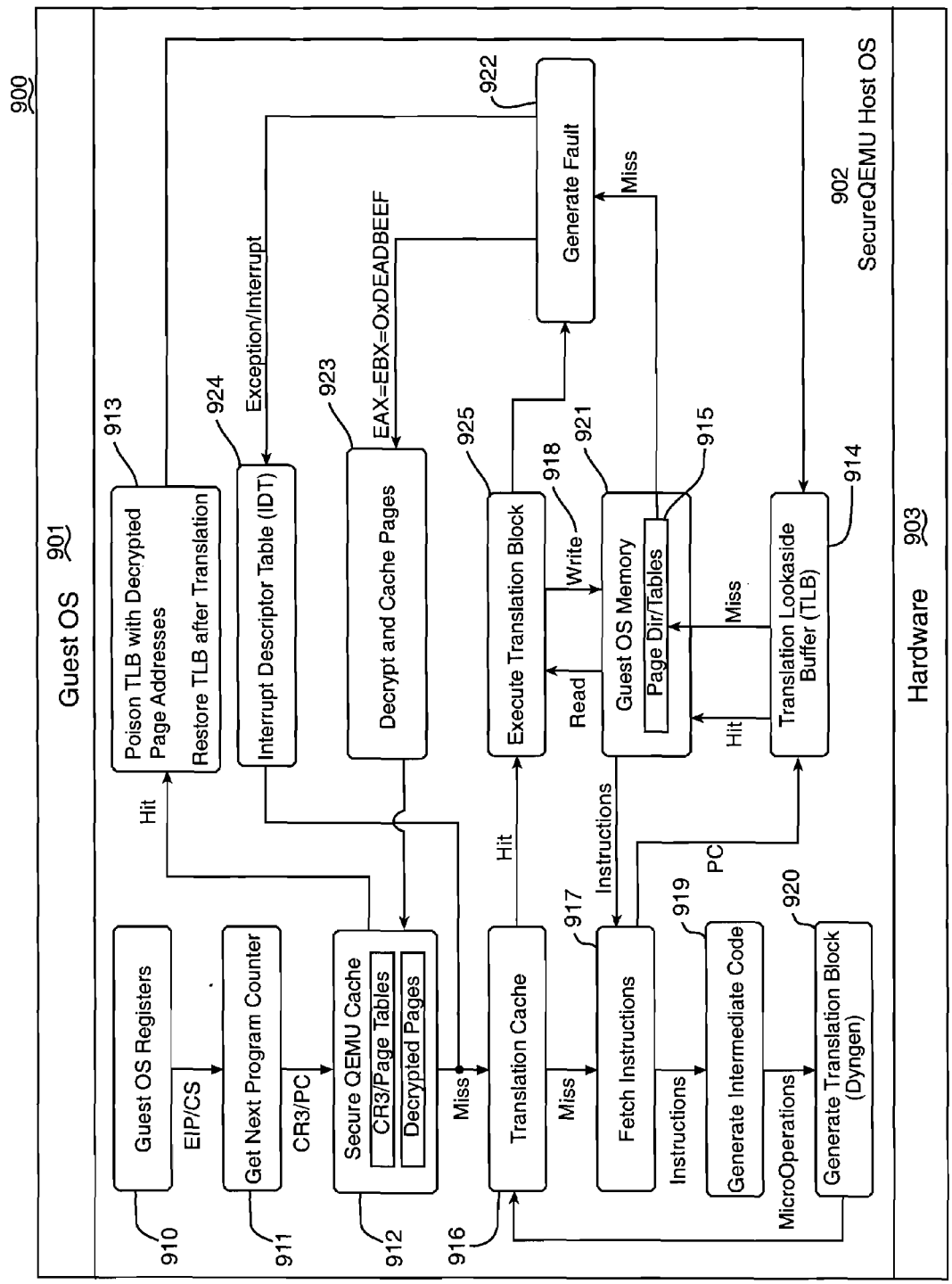
FIG. 9 is a control flow diagram.

A control flow diagram for an embodiment of SecureQEMU is shown in FIG. 9. In this embodiment, a computer system 900 includes a Guest OS 901, a SecureQEMU Host OS 902, and computer hardware 903, such as, for example, that disclosed in FIG. 3. The SecureQEMU Host OS 902 copies the current instruction pointer (EIP), code segment (CS) and page directory base (CR3) from the currently executing thread's context within the Guest OS 901 into Guest OS Registers in the SecureQEMU Host OS 902 at step 910. The program counter (linear address of CS:EIP) is calculated in step 911. The program counter and page directory base is used to lookup if the currently executing instruction resides in an encrypted page at step 912. The encrypted page cache (SecureQEMU Cache) at step 912 is a shadow page table where valid entries indicate an encrypted page within the currently executing thread's process of the Guest OS 901. These page tables and entries cannot be read or written to by the Guest OS instructions 901. If there is an encrypted page cache "hit," the SecureQEMU Host OS 902 poisons the translation lookaside buffer (TLB) with valid entries for the current program counter in step 913. The poisoned TLB entries translate the current and next page linear addresses to physical page addresses of decrypted instructions within a private SecureQEMU Host OS cache. The TLB remains poisoned while instructions are fetched and exclusive of the translation process undertaken in the unsecured Guest OS 901. Although the TLB entries are flushed periodically to accommodate other parts of the OS, the TLB will normally contain Hits for the Guest OS instructions that are copied into the SecureQEMU Host OS 902 and is progressively forced to contain more "Hits" as the SecureQEMU Host OS 902 emulates the Guest OS 901. Whether the TLB is poisoned, as at step 913, or not, the current state of the TLB is shown at step 914.

When there is a "Hit" and after the TLB is poisoned at step 913, control passes to the Translation Cache at step 916. The TLB translates the linear address to a physical address by reading the Guest OS Memory at step 921 so that the instructions can be fetched from the Guest OS memory at step 917. The Translation Cache fetches the decrypted instructions at step 917. Each basic block typically ends in a transfer of control flow, such as, for example, jmp, retn, jcc, and the like. These instructions are translated into intermediate code consisting of several micro operations at step 919. The micro operations are specific to QEMU® and the host architecture on which QEMU® runs. One or more micro operations may be used to execute a single instruction. These micro operations are pre-compiled on the SecureQEMU Host OS 902. The pre-compiled code of each micro operation for the basic block being translated are concatenated together to create the translation block at step 920. After this process completes, the translation block is cached at step 916 and ready to execute on the SecureQEMU Host OS 902 at step 925. The Guest OS memory is updated, as at step 921, as if the instructions had been executed in the Guest OS 901. The Page Directory/Tables reside in Guest OS Memory; however the Guest OS 901 context never reads the decrypted instructions in the SecureQEMU Host OS 902, thereby ensuring that the instructions executing within SecureQEMU Host OS 902 remain secure. The Guest OS Memory is updated at step 921 such that it appears as if the Guest OS instructions that were executed out-of-band in the SecureQEMU Host OS 902 were executed in the untrusted Guest OS 901. If the instructions in the Guest OS 901 could read the decrypted page frames in the SecureQEMU Host OS 902, the SecureQEMU protection would be compromised. By maintaining a separate cache of physical pages and poisoning the TLB with valid entries for instruction fetches, SecureQEMU results in fewer TLB misses, which results in fewer page table lookups a step 915 (page table lookups use more processor cycles than TLB lookups). This arrangement decreases the time it takes the SecureQEMU Host OS 902 to translate a block of instructions. TLB misses that also result in misses in the page tables at step 915 generate a fault at step 922 and an exception/interrupt at step 924. These are processed in normal manner. Moreover, as discussed in more detail below, before each interrupt, the SecureQEMU Host OS 902 checks if the EAX register equals 0xDEADBEEF, as at step 923. This signals to the SecureQEMU Host OS 902 that the emulator is currently executing a process with encrypted instructions. In this case, the SecureQEMU Host OS 902 creates the tables and pages for that process at step 912. The SecureQEMU Host OS 902 responds depending on whether encrypted code execution or code signing is enabled. If encrypted code execution is enabled without code signing, SecureQEMU allocates the process to a shadow page table, as at step 912. When code signing is enabled, the SecureQEMU Host OS 902 allocates both a shadow page table and a signed page table to the process, as discussed below.

If there is an encrypted page cache "miss" at step 912, the currently executing instruction resides in an unencrypted page. In this case, control passes to the Translation Cache at step 916 and the Translation Cache fetches the translated instructions at step 917. Each basic block typically ends in a transfer of control flow, such as, for example, jmp, retn, jcc, and the like. These instructions are translated into intermediate code consisting of several micro operations at step 919. The micro operations are specific to QEMU® and the host architecture on which QEMU® runs. One or more micro operations may be used to execute a single instruction. These micro operations are pre-compiled on the SecureQEMU Host OS 902. The pre-compiled code of each micro operation for the basic block being translated are concatenated together to create the translation block at step 920. After this process completes, the translation block is cached at step 916 and ready to execute on the SecureQEMU Host OS 902 at step 925. The SecureQEMU Host OS 902 updates the Guest OS Memory 921 by writing to the Guest OS Memory at step 918. The state of the memory and registers in the Guest OS 901 are thereby modified such that it appears as if the original Guest OS instructions were executed in the Guest OS 901. As long as the unencrypted page is properly translated, as described above, the code is executed and the Guest OS Memory is updated at steps 925 and 921. Otherwise, a fault is generated at step 922 and an exception/interrupt is generated at step 924. These are processed in normal manner.

Because the translated blocks, by design, are never self-referencing, the Guest OS instructions in the untrusted Guest OS 901 can never read the cached translated instructions or the decrypted physical page frames in the SecureQEMU Host OS 902 cache. If the untrusted Guest OS 901 could read from these sources, it would compromise the security of the system. In addition, the TLB, whose state is shown at step 914 will go to the Page Directory/Tables of the Guest OS Memory to get the physical address of the instruction as shown at step 915. Although this embodiment illustrates the operation and functionality of the SecureQEMU emulation-based software protection mechanisms in a WINDOWS® OS environment on an INTEL® architecture, this embodiment is for illustrations purposes and it will be understood that the disclosed emulation-based software protection systems and methods disclosed herein can be used on any OS and computer system architecture to provide enhanced security and data integrity.

In another embodiment, page-granularity code signing enhances the separation of privilege with respect to code execution. This protection separates code into two types. The first type is code the user of the system intends to execute. The second type is code the user does not intend to execute, such as for example, malicious code of an attacker and the like. By enabling a system to identify and track code that a user intends to execute on the system, the system can prevent an exploit, backdoor, or attack payload from executing on the system. The system also can save the state of the emulated environment to provide a record and way to later analyze a possible attack on the system.

In this embodiment, SecureQEMU uses cryptographic signing to identify and track code throughout the system. This ensures the integrity of code that is to be executed and prevents malicious code of an attacker from being executed on the emulated system. During signing, a private key is used to generate a unique value (such as a checksum or a hash) from a message (which in this case is code to be executed on the system). Because the key is secret and generated offline, an attacker does not know the secret key. Therefore, any attempt to modify or spoof user code will be detected because an attacker cannot generate unique values for malicious code or code that the attacker wants to execute on the system.

SecureQEMU ensures that all code being translated is signed with the private key. If code is not signed while the code signing feature is enabled, it is not translated by the system. Because all executed code must be translated to be executed on the system, untranslated code, such as malicious code that an attacker may try to execute on a system, cannot be executed. SecureQEMU uses the emulator to verify the signatures of code executing within the emulated environment (untrusted system) by using mechanisms within the executing environment of the emulator (trusted system). If SecureQEMU does not verify a signature, SecureQEMU prevents that code from executing. SecureQEMU also ensures that the security mechanism that verifies each signature remains uncompromised so that the emulation-based protection system remains secure.

Another embodiment includes an encryptor and an emulator such as for example, a dynamic translator. The encryptor, referred to herein as SecureEncryptor, encrypts and signs code within a binary while the SecureQEMU decrypts, verifies signatures, and executes code within those binaries. SecureEncryptor should only be used on a trusted system such as a trusted host OS of SecureQEMU. SecureEncryptor protects software such as OS files like Windows Portable Executable (PE) files, while SecureQEMU provides the runtime decryption, signature verification, and execution.

Figure 1:
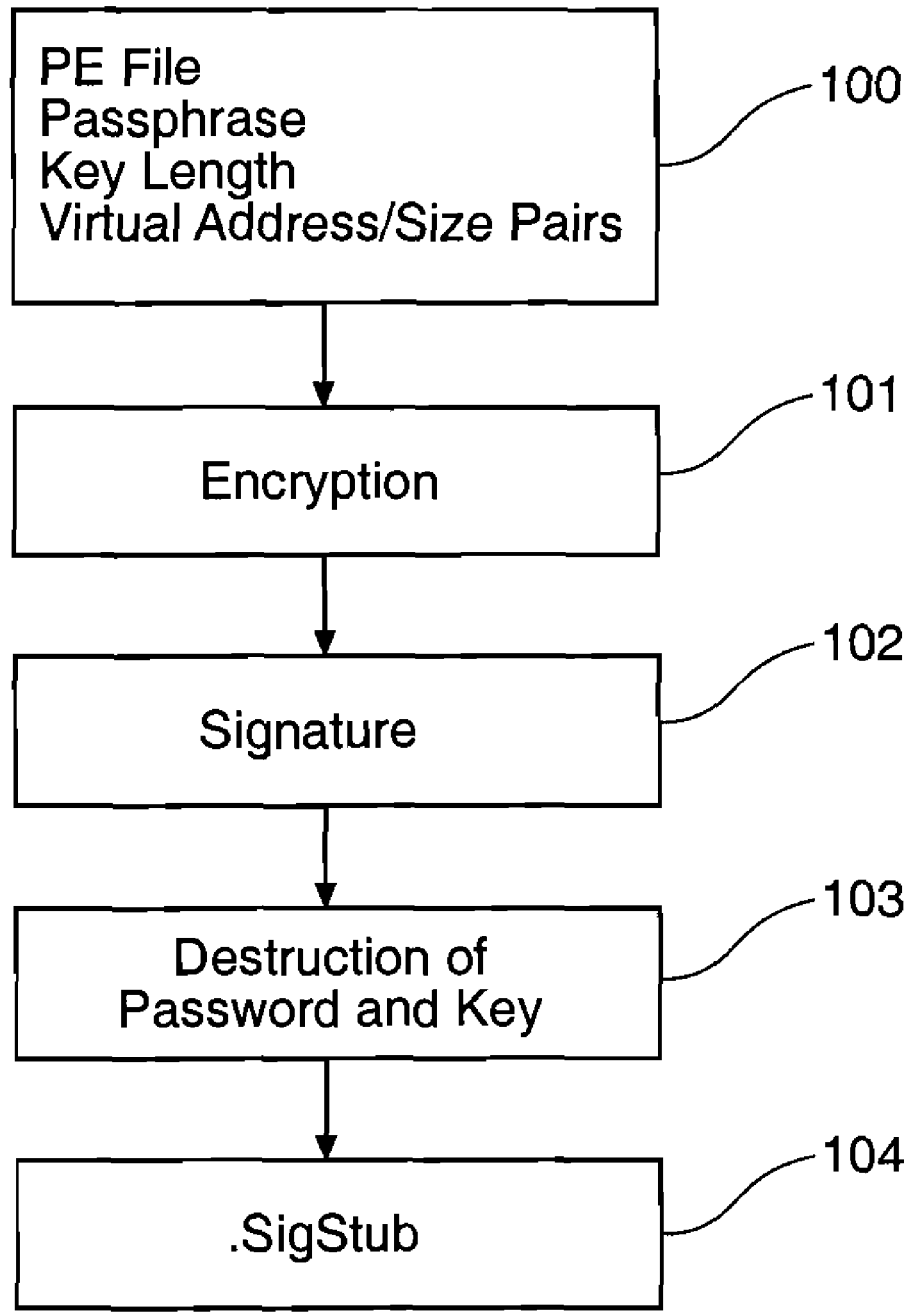
FIG. 1 discloses an embodiment of SecureEncryptor.

In one embodiment illustrated in FIG. 1, SecureEncryptor receives as input a PE file, a passphrase, the key length (in bits), and virtual address/size pairs at step 100. The virtual address/size pairs are specified by the user and designate the code regions within the binary to be encrypted or signed. The passphrase is used to derive an Advanced Encryption Standard (AES) key using, for example, a Public Key Cryptography Standard (PKCS) password-based encryption standard such as PKCS #5 and Password-Based Key Derivation Function 2 by RSA Laboratories. Each AES cipher has a 128-bit block size, with key sizes of 128, 192 and 256 bits, respectively. A key length of 128, 192 or 256 bits can be specified by the user. AES CBC mode requires 16 byte blocks. Padding the final block results in address space modifications. The virtual address and size of each code block to be encrypted must be a multiple of 16 bytes and cannot span pages. If the user wants to encrypt code which spans multiple pages then separate virtual address/size pairs must be specified for each page. Each PE section (including the code section) is page aligned. Of course, many other PKCS password-based encryption standards and derivation functions may be used with SecureEncryptor and these are disclosed for illustrative purposes. Moreover, other secret keys may be used, such as for example, public or private keys and keys using symmetric of asymmetric encryption standards.

At step 101, the code is encrypted. At step 102, the code is signed. After the code is encrypted or signed, the passphrase and key are destroyed at step 103. This provides additional security to SecureEncryptor and SecureQEMU in contrast to other encryption-based software protections that store the key within the binary or introduce the key at runtime through the use of another device. With SecureQEMU, after the encryption protection is applied by SecureEncryptor, only the emulator that operates in a trusted environment knows the key. The key is not stored in the protected binary, and it is not readable by any instructions executing within the untrusted Guest OS. This configuration makes SecureQEMU's protection more secure. An attacker has to break-out of the untrusted Guest OS emulated environment to acquire the decryption key in the trusted environment.

Before the encrypted binary is produced by SecureEncryptor, a new section is added to the file at step 104. This new section (.SigStub), referred to herein as "SigStub," contains code that signals to the Secure-QEMU that the current process contains encrypted and/or signed code. The SigStub becomes the new entry point to the binary. The SigStub section ensures that each page with encrypted and/or signed code is present in memory and it provides the mechanism that passes the initialization vector (IV), salt, keyed-Hash Message Authentication Codes (HMACs), and virtual address/size pairs to SecureQEMU.

FIG. 2 illustrates an exemplary method of setting a SigStub configuration 200. To ensure that each encrypted and/or signed page is present in memory, the code stub reads one byte of each encrypted block at step 201 and each signed code block at step 202. Next, SigStub sets EAX to 0xDEADBEEF at step 203 and EDX to point to the IV/Salt at step 204. The HMACs and virtual address/size pairs follow the IV/Salt at step 205. EBX is set depending on whether a module is to be used for encryption, signing, or both. If the module is used only for encryption, EBX is set to 0xDEADBEEF. If the module is used for encryption and signing, EBX is set to 0xCEEDCEED, 0xBEEDBEED, 0xCEEDBEED, or 0xDEADBEEF. The different values are used to open and close an initialization window used during code signing. After EAX, EBX and EDX are set, SigStub executes a trap (software interrupt) that signals SecureQEMU to decrypt code and verify HMACs.

SecureQEMU uses a cache that cannot be accessed by the untrusted Guest OS. The SecureQEMU cache consists of a shadow page table and a signed page table. Each table is used differently depending on the mode of operation of SecureQEMU. If encrypted code execution is enabled (-key option), the shadow page table is used. If page-granular code signing is enabled (-pagesign option), both tables are used. The SecureQEMU cache is referenced when a process is initialized and when basic blocks from the untrusted guest OS are being translated.

Figure 4:
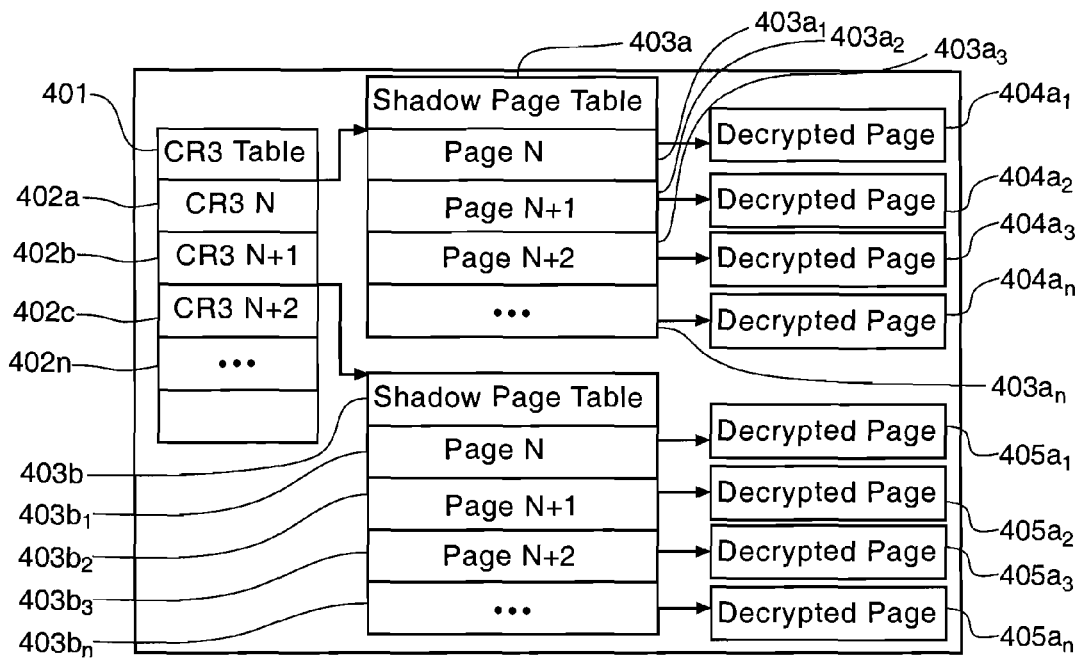
FIG. 4 is an embodiment of a Shadow Page Table Cache.

FIG. 4 is a diagram of a SecureQEMU shadow page table cache. This cache consists of a Control Register 3 (CR3) lookup table 401 whose entries 402a, 402b, 402c, 402n point to dynamically allocated shadow page tables 403a, 403b for each process which contains encrypted code. For every encrypted code region specified, SecureQEMU allocates a page $403a_1$, $403a_2$, $403a_3$, $403a_n$, $403b_1$, $403b_2$, $403b_3$, $403b_n$ in each respective shadow page table 403a, 403b.

SecureQEMU decrypts and caches each specified page $404a_1$, $404a_2$, $404a_3$, $404a_n$, $405a_1$, $405a_2$, $405a_3$, $405a_n$ only if the size specified is a multiple of 16, the page is present in memory, and the size does not span more than one page. Each encrypted code region is decrypted out-of-band of the untrusted Guest OS on the trusted Host OS. The CR3 table 401, shadow page tables 403a, 403b, and decrypted pages 404$a_1$, 404$a_2$, 404$a_3$, 404$a_n$, 405$a_1$, 405$a_2$, 405$a_3$, 405$a_n$ are only accessible to the Host OS instructions in the trusted Host OS.

Figure 5:
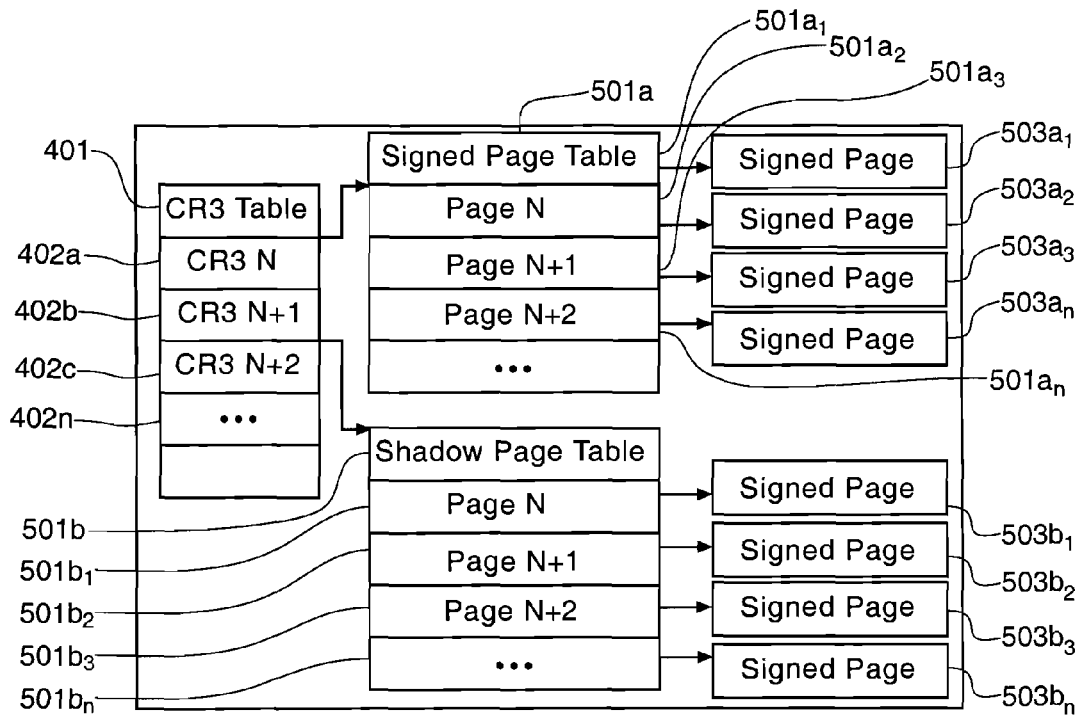
FIG. 5 is an embodiment of a Signed Page Table Cache.
Figure 6:
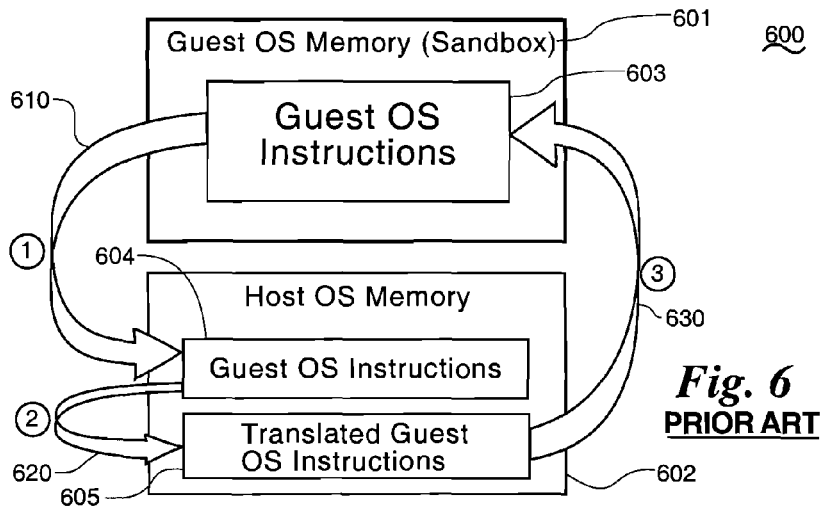
FIG. 6 discloses a known emulation technique.

When code signing is enabled, SecureQEMU allocates both a shadow page table 403a, 403b, as shown in FIG. 4 and a signed page table cache 501a, 501b, as shown in FIG. 5 to the process. As shown in FIG. 5, each of SecureQEMU's signed page tables 501a, 501b stores the code of every valid HMAC 501$a_1$, 501$a_2$, 501$a_3$, 501$a_n$, 501$b_1$, 501$b_2$, 501$b_3$, 501$b_n$, while the process's initialization window is open. The first module initialized in the address space opens the signing initialization window by setting EBX to 0xCEEDCEED or 0xCEEDBEED. The last module initialized in the address space closes the initialization windows by setting EBX to 0xBEEDBEED or 0xCEEDBEED. When EBX equals 0xCEEDBEED, only one module provides the HMACs for all modules in the address space.

For each HMAC code 501$a_1$, 501$a_2$, 501$a_3$, 501$a_n$, 501$b_1$, 501$b_2$, 501$b_3$, 501$b_n$, SecureQEMU re-computes the HMAC for the virtual address and size specified. SecureQEMU compares the computed HMAC to the valid HMAC code 501$a_1$, 501$a_2$, 501$a_3$, 501$a_n$, 501$b_1$, 501$b_2$, 501$b_3$, 501$b_n$, that is stored for each signed page to determine its authenticity and integrity. If the computed HMAC code matches a valid stored HMAC code 501$a_1$, 501$a_2$, 501$a_3$, 501$a_n$, 501$b_1$, 501$b_2$, 501$b_3$, 501$b_n$, that region of code is copied into the active signed page table 503$a_1$, 503$a_2$, 503$a_3$, 503$a_n$, 503$b_1$, 503$b_2$, 503$b_3$, 503$b_n$. This process repeats for every HMAC that is passed by every protected module. When the signing initialization window closes, the active shadow page table 403a, 403b is replaced with the active signed page table 501a, 501b. Because both tables have the same structure, this process is fast. Only one pointer in the CR3 Table needs to be updated.

As a consequence of the foregoing implementation, SecureQEMU's page-granular code signing prevents almost every type of exploit payload from executing. Because many software vulnerabilities allow an attacker to execute arbitrary code, even from remote locations, traditional prevention techniques such as canaries, variable re-ordering, shadow arguments, SafeSEH, non-executable pages, link pointer sanity checking, random cookie, ASLR, and the like focus on preventing specific memory corruption errors from occurring. Although these techniques may prevent an attacker's payload from executing, they remain a blacklist approach to software protection.

In contrast to these techniques, SecureQEMU uses a whitelist approach to software protection. It allows code that is signed to execute while preventing all other code from executing. Secure-QEMU's protection model does not focus on protecting against a specific memory corruption error. Rather, exploitation is prevented at the time an attacker's payload executes regardless of how the payload execution was induced. An attacker would have to sign the payload prior to exploitation to execute the payload and without the secret key an attacker is unable to do so.

Another advantage of SecureQEMU is that SecureQEMU's encrypted code execution and code signing increase performance over known emulation schemes such as QEMU®. This is so because SecureQEMU maintains a separate cache of physical pages containing decrypted instructions in the trusted SecureQEMU OS and poisons the TLB with valid entries for instruction fetches. This process results in fewer TLB misses resulting in fewer page table lookups that use more processor cycles than TLB lookups. It decreases the time that the SecureQEMU Host OS needs to translate a block of instructions, as compared to executing that block of instructions in an untrusted Guest OS.

Persons skilled in the art will appreciate that other modifications and combinations can be made to the SecureQEMU software protection emulation schemes disclosed herein. For example, although these emulation protection schemes are disclosed as software-implemented methods and systems, they could be implemented in separate hardware systems that emulate an OS operating on a separate computer or hardware system. The disclosed emulation schemes can be used with public or private encryption keys and mechanisms and with symmetric and asymmetric encryption mechanisms to provide code signing and integrity. Moreover, SecureEncryptor and SecureQEMU can be used to provide emulation-based software protection on any OS.

The foregoing disclosure has been presented for purposes of illustration and description and is not intended to be exhaustive or to limit the invention to the various embodiments and forms disclosed herein. Persons skilled in the art will realize and appreciate that many modifications and variations are possible in light of the above teaching. For example, although some embodiments were disclosed in the context of a Windows and x86 architecture, the disclosed emulation, encryption, and code signing protection schemes can be used with any OS and system architecture. The disclosed embodiments were chosen and described to best explain the principles of the invention and its practical application to thereby enable others skilled in the art to best use the invention in various embodiments and with various modifications suited to the particular use contemplated. The scope of the invention is to be defined by the following claims.

What is claimed is:

1. A program storage device readable by a machine, tangibly embodying a program of instructions executable by the machine to perform method steps for executing instructions in an emulated environment, comprising the steps of:
    copying encrypted guest operating system instructions from an untrusted guest operating system memory into a trusted host operating system memory;
    decrypting the encrypted guest operating system instructions in the trusted host operating system memory;
    maintaining the decrypted guest operating system instructions out-of-band of the untrusted guest operating system and inaccessible by the untrusted guest operating system;
    translating the decrypted guest operating system instructions to a set of host operating system instructions;
    executing the decrypted guest operating system instructions in the trusted host operating system; and
    modifying the untrusted guest operating system memory and registers when the set of translated host operating instructions executes in the trusted host operating system such that it appears as if the original guest operating instructions had been executed in the untrusted guest operating system.

2. The device of claim 1 wherein the program of instructions executes instructions that comprise the steps of generating a unique hash message authentication code or digital signature for each encrypted guest operating system instruction that is copied into the trusted host operating system memory;
    recomputing the hash message authentication code or digital signature of each imported guest operating system instruction using a secret key stored in the trusted host operating system memory;

translating or interpreting each guest operating instruction that has a valid hash message authentication code into a set of host operating system instructions;

executing each translated or interpreted guest operating instruction that has a valid hash message authentication code in the trusted host operating system; and modifying the state of the untrusted guest operating system memory and registers such that it appears as if the original guest operating system instructions have been executed on the untrusted guest operating system memory.

3. The device of claim 1 wherein the program of instructions executes instructions that further comprise the steps of maintaining any guest operating system instructions that do not have a valid hash message authentication code untranslated and unexecuted, wherein any malicious code remains unexecuted in the trusted host operating system, thereby protecting the untrusted guest operating system.

4. The device of claim 1 wherein the program of instructions executes instructions that further comprise the step of maintaining a secret key in the trusted host operating system where it is never accessible by the untrusted guest operating system instructions.

5. The device of claim 1, wherein the program of instructions executes instructions that further comprise one or more shadow page tables for each process that contains encrypted code and one or more decrypted pages for caching each decrypted page.

6. The device of claim 1, wherein the program of instructions executes instructions that further comprise one or more signed page tables for each process that contains signed code and one or more signed pages for caching each authenticated page.

7. A method of emulation-based page granularity code signing comprising the steps of:

copying guest operating system instructions and associated hash message authentication codes and/or digital signatures of each guest operating instruction from an untrusted guest operating system memory into a trusted host operating system memory;

recomputing the hash message authentication codes using a secret key in the trusted host operating system memory;

maintaining the secret key in the trusted host operating system memory and inaccessible by the untrusted guest operating system instructions;

translating each guest operating system instruction that has a valid hash message authentication code to a set of host operating system instructions;

executing the decrypted guest operating system instructions in the trusted host operating system; and modifying the guest operating system memory and registers when the set of translated host operating instructions executes in the trusted host operating system, such that it appears as if the original guest operating system instructions had been executed in the untrusted guest operating system.

8. The method of claim 7, further comprising the step of maintaining any guest operating system instructions that do not have a valid hash message authentication code and/or digital signature untranslated and unexecuted in the trusted host operating system.

9. The method of claim 7, wherein malicious code remains unexecuted in the trusted host operating system, thereby protecting the untrusted guest operating system and the trusted host operating system.

10. A non-transitory storage medium which embodies instructions executable by a computer for emulating an untrusted guest operating system on a trusted host operating system, comprising:

a first segment including emulator code, wherein the emulator code copies encrypted guest operating system instructions from an untrusted guest operating system memory into a trusted host operating system memory;

a second segment including decryption code for decrypting the encrypted guest operating system instructions in the trusted host operating system memory;

a third segment including translating code for translating the decrypted guest operating system instructions to a set of instructions to be executed in the trusted host operating system; and a fourth segment including code for executing the decrypted and translated guest operating system instructions in the trusted host operating system and modifying the untrusted guest operating system memory and registers when those instructions are executed in the trusted host operating system, such that it appears as if the original encrypted guest operating system instructions had been executed in the untrusted guest operating system.

11. The storage medium of claim 10, further comprising a fifth segment including code for recomputing hash message authentication codes and/or digital signatures for each imported encrypted guest operating instruction that is copied into the trusted host operating system memory;

translating or interpreting each guest operating instruction that has a valid hash message authentication code into a set of host operating system instructions;

executing each of the translated or interpreted guest operating instructions that has a valid hash message authentication code in the trusted host operating system; and modifying the state of the untrusted guest operating system memory and registers such that it appears as if the original guest operating system instructions have been executed in the untrusted guest operating system.

12. The storage medium of claim 11, further comprising a segment with code for managing a secret key for recomputing a hash message authentication code and/or a digital signature for each imported encrypted guest operating system instruction that is copied into the trusted host operating system memory, wherein the secret key includes one or more of a symmetric key, an asymmetric key, a public key, or a private key.

13. A method of emulating an untrusted guest operating system, comprising the steps of:

copying guest operating system instructions and hash message authentication codes or digital signatures from an untrusted guest operating system memory into a trusted host operating system memory;

recomputing each hash message authentication code or signature of the imported guest operating system instructions using a secret key that is stored in the trusted host operating system memory;

translating or interpreting each guest operating instruction that has a valid hash message authentication code or digital signature into one or more host operating system instructions;

executing each of the translated or interpreted guest operating system instructions in the trusted host operating system; and modifying the state of the untrusted guest operating system memory and registers such that it appears as if the original guest operating system instructions that were executed in the trusted host operating system memory have been executed on the untrusted guest operating system memory.

14. The method of claim 13, further comprising the step of maintaining the secret key in the trusted host operating system memory where it is never accessible by the guest operating system instructions.

15. The method of claim 13, further comprising the step of not translating any guest operating system instruction that does not have a valid hash message authentication code or digital signature so that any malicious code that is copied from the untrusted guest operating system memory remains unexecuted in the trusted host operating system memory.

16. A computer system, comprising:
a processor;
a program storage device readable by the computer system, tangibly embodying a program of instructions executable by the computer system to emulate an untrusted guest operating system in a trusted host operating system, wherein the program of instructions includes the steps of
copying encrypted guest operating system instructions from an untrusted guest operating system memory into a trusted host operating system memory;
decrypting the guest operating system instructions in the trusted host operating system memory;
maintaining the decrypted guest operating system instructions out-of-band of the untrusted guest operating system and inaccessible by the untrusted guest operating system;
translating the decrypted guest operating system instructions to a set of host operating system instructions;
executing the decrypted guest operating system instructions in the trusted host operating system; and
modifying the guest operating system memory and registers when the set of translated host operating instructions executes in the trusted host operating system such that it appears as if the original guest operating instructions had been executed.

17. The computer system of claim 16, wherein the program of instructions further comprises the steps of generating a unique hash message authentication code or digital signature for each encrypted guest operating instruction that is copied into the trusted host operating system memory;
recomputing the hash message authentication code or digital signature of each imported guest operating system instruction using a secret key that is stored in the trusted host operating system memory;
translating or interpreting each guest operating instruction that has a valid hash message authentication code or digital signature into one or more host operating system instructions;
executing the translated or interpreted guest operating instructions in the trusted host operating system; and
modifying the state of the untrusted guest operating system memory and registers such that it appears as if the original guest operating system instructions that were executed in the trusted host operating system have been executed in the untrusted guest operating system.

18. The computer system of claim 16, wherein the program of instructions further includes the steps of maintaining any guest operating system instructions that do not have a valid hash message authentication code or digital signature untranslated and unexecuted, so that any malicious code remains unexecuted in the trusted host operating system, thereby protecting the untrusted guest operating system and the trusted host operating system.

19. The computer system of claim 16, wherein the program of instructions further includes the step of maintaining a secret key in the trusted host operating system where it is never accessible by the untrusted guest operating system instructions.

20. An apparatus for emulating an untrusted guest operating system in a trusted host operating system comprising:
a processor;
a storage device storing a program of instructions executable by the processor to emulate an untrusted guest operating system in a trusted host operating system, wherein the program of instructions includes the steps of
copying encrypted guest operating system instructions from an untrusted guest operating system memory into a trusted host operating system memory;
decrypting the guest operating system instructions in the trusted host operating system memory;
maintaining the decrypted guest operating system instructions out-of-band of the untrusted guest operating system and inaccessible by the untrusted guest operating system;
translating the decrypted guest operating system instructions to a set of host operating system instructions;
executing the decrypted and translated guest operating system instructions in the trusted host operating system; and
modifying the untrusted guest operating system memory and registers when the set of translated host operating instructions executes in the trusted host operating system such that it appears as if the original guest operating instructions had been executed in the untrusted guest operating system.

21. The apparatus of claim 20, wherein the program of instructions further comprises the steps of generating a unique hash message authentication code or digital signature for each encrypted guest operating instruction that is copied into the trusted host operating system memory;
recomputing the hash message authentication code or digital signature of each imported guest operating system instruction using a secret key that is stored in the trusted host operating system memory;
translating or interpreting each guest operating instructions that has a valid hash message authentication code or digital signature into one or more host operating system instructions;
executing the translated or interpreted guest operating instructions in the trusted host operating system; and
modifying the state of the untrusted guest operating system memory and registers such that it appears as if the original guest operating system instructions that were executed in the trusted guest operating system were executed in the untrusted guest operating system memory.

22. The apparatus of claim 20, wherein the program of instructions further includes the steps of maintaining any guest operating system instructions that do not have a valid hash message authentication code or digital signature untranslated and unexecuted, so that any malicious code remains unexecuted in the trusted host operating system, thereby protecting the guest operating system and the host operating system.

23. The apparatus of claim 20, wherein the program of instructions further includes the step of maintaining a secret key in the trusted host operating system where it is never accessible by the untrusted guest operating system instructions.

* * * * *